Aug. 8, 1950     H. H. SPENCER     2,518,394
GENERATOR DRIVE CONTROL SYSTEM
Filed Oct. 28, 1948
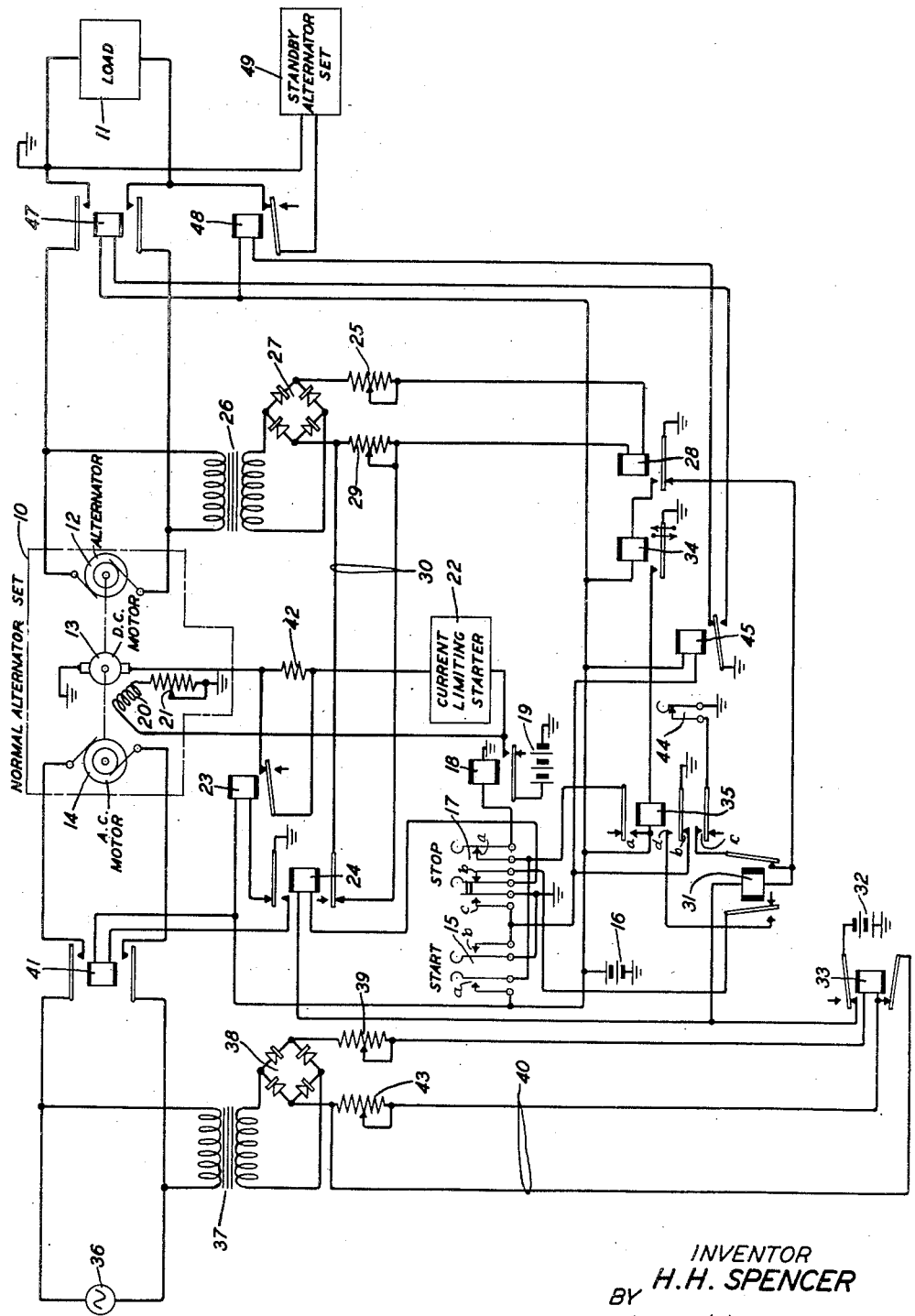
INVENTOR
H.H. SPENCER
BY
G. F. Heuerman
ATTORNEY Patented Aug. 8, 1950

2,518,394

UNITED STATES PATENT OFFICE 2,518,394

GENERATOR DRIVE CONTROL SYSTEM

Harry H. Spencer, Springfield, N. J., assignor to Bell Telephone Laboratories, Incorporated, New York, N. Y., a corporation of New York Application October 28, 1948, Serial No. 57,039

14 Claims. (Cl. 171—97)

This invention relates to power supply systems and more particularly to an automatically controlled power plant for uninterruptedly supplying current to a load irrespective of failures or voltage fluctuations in excess of predetermined magnitudes of a primary commercial power supply source from which current is normally supplied to the power plant.

The invention is of use, for example, for supplying energizing current to equipment of a carrier current telephone system, which requires for its continuous operation, an uninterrupted supply of alternating current the voltage of which remains within a predetermined amplitude range.

An object of the invention is to provide improved motor-generator apparatus for supplying current to a load without interruption or excessive voltage variation, irrespective of interruption or amplitude change of current normally supplied to a driving motor of said apparatus.

In accordance with an embodiment of the invention described herein for the purpose of illustration, an alternator for supplying current to a load has coupled to it an alternating current motor and a direct current motor for driving it. During normal operation, current is supplied from a commercial alternating current source to the alternating current motor causing it to drive the alternator. During a starting period and during periods when the voltage of the alternating current source falls below a certain minimum value, the direct current motor is energized by current from a battery to cause it to drive the alternator. A standby alternator set assumes the supply for the load if the alternator output voltage falls below a certain minimum value while the direct current motor is driving the alternator.

Apparatus is provided for controlling the energization of the two motors and the standby alternator set under joint control of the alternator output voltage and the alternating current supply line voltage. This control apparatus makes possible the transfer of the alternator drive from one motor to the other without introducing large amplitude voltage variations at the alternator output.

When the drive is transferred from the direct current motor to the alternating current motor, the battery remains connected to the direct current motor so that it may more readily assume the drive of the alternator. A resistor is inserted in the armature circuit of the direct current motor to limit the armature current while the alternator is being driven by the alternating current motor, the resistor being short-circuited when the direct current motor drives the alternator.

Apparatus is also provided to prevent hunting between the two motors due to fluctuations either of the commercial power service line voltage or of the alternator output voltage of relatively small amplitude.

Another feature of the invention is means to transfer the drive from the alternating current motor to the direct current motor if the alternator output voltage drops to a certain value below normal. This feature will be of value in the event the commercial power service line voltage remains normal but its frequency decreases so that the alternating current motor is unable to properly maintain the alternator output voltage. If the decrease in the alternator output voltage was due to a failure in the alternator itself, means are provided to shut down the normal motor-generator set and to transfer the load to a similar standby set, but not before the alternator drive is transferred to the direct current motor.

Other objects, features, and aspects of the invention will be understood from the following description made with reference to the single figure of the drawing which shows a simplified circuit schematic of a power plant embodying the features of the invention.

Referring to the drawing, an alternating current load 11 is connected to receive power either from a normal two-motor alternator set 10 comprising alternator 12 mechanically coupled to a direct current motor 13 and an alternating current motor 14, or, as shown in the drawing, from a similar standby alternator set 49. The normal supply set 10 is started initially by manually operating the start switch 15. This operation of contact $a$ of start switch 15 connects the holding battery 16 through the normally closed contact $a$ of stop switch 17 to the winding of relay 18, causing it to operate. The operation of relay 18 connects the supply battery 19 to the field winding 20 and control rheostat 21 of motor 13 in series. The same operation also connects the battery 19 through a conventional current-limiting starter 22 and the closed contact of relay 23 to the armature of the direct current motor 13, bringing it up to normal speed. The winding of relay 23 is energized by the battery 16 with ground established through the upper contact of relay 24.

When the terminal voltage of alternator 12 has reached a certain value as determined by the adjustment of rheostat 25, the current through the transformer 26, rectifier 27, and the winding of relay 28 will cause relay 28 to operate. With relay 24 deenergized, the rheostat 29 is short-circuited by the leads 30 through the lower contact of relay 24.

The operation of relay 28 removes ground from the winding of relay 31 causing relay 31 to release. While relay 28 is deenergized, relay 31 is operated by current from a holding battery 32 flowing in a circuit comprising an armature and contact of relay 33 and the armature and a contact of relay 28. The relay 33 is normally held operated by current from the commercial supply 36 flowing through transformer 37, rectifier 38, and rheostat 39, and when operated, connects the battery 32 to one terminal of each of the windings of relays 31 and 24. Rheostat 43 is short-circuited by the lead 40 through the lower contact and armature of relay 33.

The ground connection removed from relay 31 due to the operation of relay 28 is now applied to the winding of a slow acting relay 34 causing it to operate. Both relays 34 and 35 have one side of their windings connected to the holding battery 16. Relay 35 therefore operates when the operation of relay 34 connects ground to its winding. A holding circuit for the winding of relay 18 is established from the battery 16 through contact a of relay 35 so that the start switch 15 may now be released. Relay 34 is slow acting allowing relay 31 to release before the winding of relay 31 is grounded through contact c of relay 35.

Relay 35 in operating removes the ground connection through its contact b from the winding of relay 45, causing relay 45 to release when or if the start switch 15 is released. This release of relay 45 transfers a ground connection from the winding of relay 48 to the winding of relay 47. Both relays 47 and 48 have one side of their windings permanently connected to the holding battery 16 and, heretofore, relay 48 has been held operated to connect the load 11 to the standby alternator set 49. The ground connection transfer caused by the release of relay 45 causes relay 48 to release and relay 47 to operate. Relays 47 and 48 may be mechanically interlocked to prevent one from operating before the other releases. The release of relay 48 and the subsequent operation of relay 47 transfers the connection of the load 11 from the standby set 49 to the normal set 10.

The release of relay 31 connects ground through a contact d of relay 35 and through the normally closed contact b of the stop switch 17 to the winding of relay 24, causing it to operate if the voltage of the supply 36 is such as to maintain relay 33 operated. This operation of relay 24 removes ground from the winding of relay 23 causing it to release, and it also completes a circuit from ground through a contact of relay 24, the winding of relay 41, and the battery 16 to ground, causing relay 41 to operate. The release of relay 23 removes the short circuit from the armature resistance 42 and the substantially simultaneous operation of relay 41 connects the alternating current motor 14 to the commercial supply 36.

The resistance 42 limits the armature current of the direct current motor 13 so that the alternator 12 is now driven by its alternating current motor 14. Relay 18, however, remains operated so that the direct current motor field 20 remains energized and the battery 19 remains connected through the resistance 42 to the armature of the direct current motor 20. It is now necessary only to operate the relay 23 to condition the direct current motor 13 to assume the drive of the alternator 12.

A decrease in the voltage of the commercial supply 36 below normal to a value determined by the adjustment of the rheostat 39 will cause the relay 33 to release. This release will result in a transfer of motor drive from the alternating current motor 14 to the direct current motor 13 by removing the battery 32 from the winding of relay 24 causing relay 24 to release. The release of relay 24 removes ground from the winding of relay 41 causing it to release which disconnects the alternating current motor 14 from the commercial supply 36, and reconnects ground to the winding of relay 23 causing it to operate and again short-circuit the armature resistance 42. Relays 33, 24 and 23 are very fast acting as compared to relays 34, 35 and 18 so that the motor drive is transferred to the direct current motor 13 before the output voltage of the alternator decreases sufficiently to allow the series of relays 28, 34, 35 and 18 to release and disconnect the direct current motor 13 from its supply battery 19.

The release of relay 33 also removes the short circuit from the rheostat 43, thereby increasing the resistance in the winding of relay 33. Relay 33 therefore will not reoperate until the voltage of supply 36 returns to a value above that at which relay 33 released, the exact value being dependent on the adjustment of the rheostats 43 and 39. The reoperation of relay 33 replaces the short circuit on rheostat 43 and returns the motor drive to the alternating current motor 14 by the operation of relays 24 and 41 and the release of relay 23 as hereinbefore described.

Emergency conditions, such as failure of the alternating current motor 14 or the alternator 12, are safeguarded by the relay 28 which is adjusted to release at an alternator output voltage below normal and determined by the adjustment of rheostats 25 and 29. (While the alternating current motor 14 is driving the alternator 12, the short circuit on the rheostat 29 is removed by the operation of relay 24, which relay must operate before the alternating current motor 14 is connected to its supply 36.) Should the alternator 12 output decrease to this predetermined value, relay 28 will release, removing ground from the winding of relay 34 and applying ground to the winding of relay 31. Relay 31 will operate if the supply 36 voltage is normal so that the relay 33 is operated and will lock up to ground through contact c of relay 35 and the closed switch 44. Relay 31, in operating will remove ground from the winding of relay 24, thus causing the motor drive to be transferred to the direct current motor 13 as hereinbefore described. The release of relay 24 replaces the short circuit on rheostat 29, thus raising the current in the winding of relay 28 so that it reoperates and replaces the ground on the winding of relay 34. Relay 34, as previously described, is slow acting and does not release during the interval relay 28 is released.

The direct current motor 13 drives the alternator 12 at normal output, if it is able to do so, and direct current motor operation continues until the lock-up on relay 31 is removed by operating the switch 44. The switch 44 may be operated locally or by remote control means well known in the art. This operation will cause relay 31 to release which will in turn cause the motor drive to be again transferred to the alternating current motor 14 as previously described.

But, if motor 13 on assuming the alternator 12 drive is unable to maintain the alternator 12 output voltage, relay 28 will again release at a voltage now determined by the adjustment of only rheostat 25 since rheostat 29 is short-circuited during direct current motor operation by the release of relay 24. This voltage will be lower than that which caused relay 28 to release during alternating current motor drive since the resistance in series with the winding of relay 28 has been decreased by short-circuiting rheostat 29. This removal of ground from the winding of relay 34 by the release of relay 28 will now allow relay 34 to release. The release of relay 34 causes relay 35 also to release by removing ground from its winding. The release of relay 35 removes the battery 16 from the starting relay 18 causing it to release and shut down the set by removing the supply battery 19 from the direct current motor 13. The alternating current motor 14 is disconnected from its supply 36 at the time of the motor drive transfer.

The release of relay 35 causing the alternator set 10 to shut down also reconnects ground to the winding of relay 45 through contact b of relay 35. Relay 45 will now operate since the one side of its winding is permanently connected to the holding battery 16. The operation of relay 45 transfers the ground connection through its armature from the winding of relay 47 to the winding of relay 48. As hereinbefore described, relay 47 will release, and, in turn, relay 48 will operate. The release of relay 47 and operation of relay 48 transfers the load 11 connection from the normal alternator set 10 to the standby set 49 running normally at no load. The set 49 then assumes the supply for the load 11.

The alternator set 10 may be stopped at any time by manually operating the stop switch 17. By this operation of the contact a of stop switch 17, the relay 18 will be released, causing the battery 19 to be disconnected from the direct current motor 13. This operation of the contact b of stop switch 17 will disconnect the alternating current motor 14 from its source 36, if it be so connected, by removing ground from the winding of relay 24, causing it to release. The release of relay 24 removes ground from relay 41 causing it to release and open its contacts and thus deenergize the alternating current motor 14. The operation of the contact c of the stop switch 17 connects ground to the winding of relay 45 causing relay 45 to operate and transfer the connection of the load 11 from the normal set 10 to the standby set 49 as hereinbefore described. A holding circuit for relay 45 will be obtained by the ground connection of contact b of relay 35 when relay 35 releases.

For the purpose of performing tests or maintenance on the alternator set 10 while it is running, the load may be momentarily transferred to the standby set 49 by holding the start switch 15 depressed. This connects ground to the winding of relay 45 through the contact b of the start switch 15 causing relay 45 to operate and transfer the load 11 connection to the standby set 49. The release of the start switch 15 returns the load 11 connection to the normal set 10 by causing the release of relay 45.

Although the invention has been described as relating to a specific embodiment, many modifications thereof will occur to one skilled in the art without deviating from the spirit of the invention. The invention therefore should not be limited to the embodiment as set forth in detail herein.

What is claimed is:

1. In combination, a generator for supplying alternating current to a load, a direct current motor having a field winding and an armature winding, an alternating current motor, means for mechanically coupling said direct current motor and said alternating current motor to said generator for driving it, a circuit for supplying current from an alternating current supply source to said alternating current motor comprising a first switching means for completing said circuit, means for supplying current from a direct current source to said windings of said direct current motor, a resistor connected in series with said armature winding and said direct current source, a second switching means for completing a short-circuiting current path around said resistor, and means responsive to current from said alternating current supply source for opening said first switching means and for substantially simultaneously closing said second switching means when the voltage of said supply source decreases below a certain minimum value.

2. In combination, a generator for supplying alternating current to a load, a direct current motor, an alternating current motor, means for mechanically coupling said direct current motor and said alternating current motor to said generator for driving it, means for supplying current from a direct current source to said direct current motor, means for supplying current from an alternating current supply source to said alternating current motor, and automatic switching means having two conditions and under joint control of the output voltage of said generator and the voltage of said alternating current supply source for controlling the energization of said alternating current motor by current from said alternating current supply source and the energization of said direct current motor by current from said direct current source, said switching means when in one condition causing said generator to be driven by said alternating current motor and when in the other condition causing said generator to be driven by said direct current motor.

3. In combination, a generator for supplying current to a load, a direct current motor comprising an armature winding and a field winding, an alternating current motor, means for mechanically coupling said direct current motor and said alternating current motor to said generator for driving it, a circuit for supplying current from an alternating current supply source to said alternating current motor comprising a first switching means for completing said circuit, a circuit for supplying current from a direct current supply source to said direct current motor comprising a resistor in series with said armature winding and said direct current supply source, a second switching means for completing a short-circuiting current path around said resistor, and means responsive jointly to the output voltage of said alternator and to the voltage of said alternating current supply source for operating said first and said second switching means.

4. A combination in accordance with claim 3, said last-named means adapted to operate said switching means to transfer the drive of said generator when it is being driven by said alternating current motor from said alternating current motor to said direct current motor in response to a decrease in the voltage of said alternating current source below a first predetermined value.

5. A combination in accordance with claim 4, and voltage responsive means in combination with said last-named means to automatically operate said switching means to return the drive of said generator, after having been transferred from said alternating current motor to said direct current motor in response to a decrease in the voltage of said source, to said alternating current motor in response to an increase in the voltage of said source beyond a second predetermined value higher than said first value.

6. A combination in accordance with claim 3, said last-named means adapted to operate said switching means to transfer the drive of said generator when it is being driven by said alternating current motor from said alternating current motor to said direct current motor in response to a decrease in the output voltage of said generator below a third predetermined value.

7. A combination in accordance with claim 6 and non-automatic switching means to return the drive of said generator after having been transferred from said alternating current motor to said direct current motor as a result of a decrease in the output voltage of said generator to said alternating current motor.

8. A combination in accordance with claim 6, a standby generator normally running at no load, and a third switching means operated in response to a decrease in the output voltage of said generator beyond a fourth predetermined value lower than said third value to deenergize said direct current motor and sequentially disconnect said load from said first generator and connect said load to be supplied by said standby generator.

9. In combination, a generator for supplying current to a load, a direct current motor comprising an armature winding and a field winding, an alternating current motor, means for mechanically coupling said direct current motor and said alternating current motor to said generator for driving it, a circuit for supplying current from an alternating current supply source to said alternating current motor comprising a first switching means for completing said circuit, a circuit for supplying current from a direct current supply source to said direct current motor comprising a second switching means for completing said circuit, a resistor in series with said armature winding, and a third switching means for completing a short-circuiting current path around said resistor, means to control said first and said third switching means to alternatively cause said generator to be driven by said alternating current motor during periods of normal alternating current supply source voltage and normal generator output voltage, or, to transfer the drive of said generator from said alternating current motor to said direct current motor when either of said last-named voltages falls below certain predetermined values, said last-named means comprising a fourth switching means responsive to variations in the voltage of said alternating current supply beyond certain predetermined values and a fifth switching means responsive to variations in the voltage of said generator output beyond certain predetermined limits, and means under control of said fifth switching means to control said second switching means to deenergize said direct current motor in response to a decrease in the voltage of said generator output beyond a certain predetermined value while said generator is being driven by said direct current motor.

10. A combination in accordance with claim 9 comprising a standby generator normally running at no load, a sixth switching means responsive to the deenergization of said direct current motor to sequentially disconnect said load from said first generator and connect said load to said standby generator.

11. A combination in accordance with claim 9 comprising lock-up means to prevent the drive of said generator from being transferred from said direct current motor to said alternating current motor when said drive has been transferred to said direct current motor from said alternating current motor by said third switching means.

12. In a system for supplying alternating current to a load, a generator, a direct current motor having a field winding and an armature winding, a resistor in series with said armature winding, a short-circuiting path around said resistor, a first switching means to interrupt said path, a circuit to supply current to said motor windings from a direct current supply source, an alternating current motor, a source of alternating current, a second switching means to complete a circuit to supply current to said alternating current motor from said alternating current source, means to mechanically couple said direct current motor and said alternating current motor to said generator to drive it, means comprising said direct current motor to start said generator and to cause said generator to supply current to said load, and automatic switching means responsive to the increase in output voltage of said generator to a predetermined value to transfer the drive of said generator from said alternating current motor to said direct current motor by substantially simultaneously operating said first switching means to remove said short circuit and said second switching means to complete said circuit to supply current to said alternating current motor.

13. A system for supplying current to a load comprising a generator, a direct current motor, an alternating current motor, means to mechanically couple said alternating current motor and said direct current motor to said generator to drive the latter, an alternating current source and means to energize said alternating current motor from said source, a direct current source and means to energize said direct current motor from said direct current source, switching means to control said last two-named means to cause said generator to be driven by either said direct current motor or said alternating current motor, a resistance in series with the armature of said direct current motor and said direct current source, a short-circuiting path around said resistance, and means under control of said switching means to open said short-circuiting path when said generator is being driven by said alternating current motor.

14. A system for supplying current to a load comprising a generator, a direct current motor, an alternating current motor, means to mechanically couple said alternating current motor and said direct current motor to said generator to drive it, a direct current source and means to energize said direct current motor by said source, an alternating current source, switching means to cause said generator to be driven by said alternating current motor or said direct current motor alternatively, means under control of said switching means to cause said alternating current motor to be energized by said alternating current source when said generator is driven by said alternating current motor, a resistance in series with the armature of said direct current motor and said direct current source, a short-circuiting path around said resistance, and means under control of said switching means to remove said short-circuiting path when said generator is being driven by said alternating current motor.

HARRY H. SPENCER.

REFERENCES CITED

The following references are of record in the file of this patent:

UNITED STATES PATENTS

| Number | Name | Date |
|---|---|---|
| 2,252,452 | Bany | Aug. 12, 1941 |